(12) United States Patent
Naito et al.

(10) Patent No.: US 10,449,622 B2
(45) Date of Patent: Oct. 22, 2019

(54) CONDUCTIVE JOINT ARTICLE AND METHOD FOR MANUFACTURING SAME

(71) Applicant: HITACHI CHEMICAL COMPANY, LTD., Tokyo (JP)

(72) Inventors: Takashi Naito, Tokyo (JP); Shinichi Tachizono, Tokyo (JP); Kei Yoshimura, Tokyo (JP); Yuji Hashiba, Tokyo (JP); Kiyomi Nakamura, Tokyo (JP); Taigo Onodera, Tokyo (JP); Takuya Aoyagi, Tokyo (JP); Tatsuya Miyake, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/567,862

(22) PCT Filed: Apr. 22, 2016

(86) PCT No.: PCT/JP2016/062745
§ 371 (c)(1),
(2) Date: Oct. 19, 2017

(87) PCT Pub. No.: WO2016/175146
PCT Pub. Date: Nov. 3, 2016

(65) Prior Publication Data
US 2018/0111218 A1   Apr. 26, 2018

(30) Foreign Application Priority Data
Apr. 28, 2015   (JP) .................................. 2015-091332

(51) Int. Cl.
*H01R 4/02*      (2006.01)
*B23K 11/16*     (2006.01)
(Continued)

(52) U.S. Cl.
CPC ............ *B23K 11/16* (2013.01); *B23K 1/0004* (2013.01); *B23K 11/11* (2013.01); *B23K 11/18* (2013.01);
(Continued)

(58) Field of Classification Search
CPC ....................................................... H01R 4/02
(Continued)

(56) References Cited

U.S. PATENT DOCUMENTS 4,442,966 A * 4/1984 Jourdain ............. H01L 23/4828
228/122.1
4,945,071 A * 7/1990 Friesen ................... C03C 3/122
106/1.14
(Continued)

FOREIGN PATENT DOCUMENTS

JP   2011-201714 A   10/2011
JP   2011-224577 A   11/2011
(Continued)

OTHER PUBLICATIONS

International Search Report, PCT/JP2016/062745, dated Aug. 2, 2016, 2 pgs.

*Primary Examiner* — Chau N Nguyen
(74) *Attorney, Agent, or Firm* — Volpe and Koenig, P.C.

(57) ABSTRACT

It is an objective of the invention to provide a conductive joint article exhibiting electrical joinability comparable to that of solder joining of easy-to-solder joinable metals even when a joined member of the conductive joint article is made of a hard-to-solder joinable metal. There is provided a conductive joint article with conductive joined members electrically joined via a joining layer, at least one of the joined members being made of a hard-to-solder joinable metal. The joining layer comprises an oxide glass phase and a conductive metal phase. The oxide glass phase includes (Continued)

vanadium as a major constituent and at least one of phosphorus, barium and tungsten as an accessory constituent, and has a glass transition point of 390° C. or less. And, connection resistance between the joined members exhibits less than $1 \times 10^{-5}$ $\Omega/mm^2$.

15 Claims, 4 Drawing Sheets

(51) Int. Cl.
*B23K 11/18* (2006.01)
*B23K 11/11* (2006.01)
*B23K 1/00* (2006.01)
*B23K 35/36* (2006.01)
*H01B 1/02* (2006.01)
*H01R 43/02* (2006.01)

(52) U.S. Cl.
CPC ......... *B23K 35/3601* (2013.01); *H01B 1/023* (2013.01); *H01B 1/026* (2013.01); *H01R 4/029* (2013.01); *H01R 43/0214* (2013.01)

(58) Field of Classification Search
USPC ........................................ 174/94 R
See application file for complete search history.

(56) References Cited

U.S. PATENT DOCUMENTS

| | | | | |
|---|---|---|---|---|
| 5,663,109 A | * | 9/1997 | Dietz | ..................... C03C 3/122 106/1.14 |
| 2012/0325297 A1 | | 12/2012 | Naito et al. | |
| 2014/0145122 A1 | | 5/2014 | Sawai et al. | |
| 2014/0285039 A1 | | 9/2014 | Aoyagi et al. | |

FOREIGN PATENT DOCUMENTS

| | | |
|---|---|---|
| JP | 2012-099453 A | 5/2012 |
| JP | 2013-032255 A | 2/2013 |
| JP | 2014-184474 A | 10/2014 |

* cited by examiner $T_g$: GLASS TRANSITION POINT, $M_g$: YIELD POINT,
$T_s$: SOFTENING POINT, $T_{cry}$: CRYSTALLIZATION TEMPERATURE

CONDUCTIVE JOINT ARTICLE AND METHOD FOR MANUFACTURING SAME

TECHNICAL FIELD OF THE INVENTION

The present invention relates to a technique of forming conductive joint articles exhibiting low connection resistance, and particularly to conductive joint articles exhibiting favorable electrical conductivity even when joined members of the conductive joint articles are made of a hard-to-solder joinable metal and to a method for manufacturing the conductive joint articles.

DESCRIPTION OF BACKGROUND ART

Conventionally, as a material of an electrode and a wire (hereinafter, referred to as an electrode/wire) in electrical/electronic equipment, noble metal (e.g., copper, silver and gold) or its alloy has been often used. In general, solder joining is adopted for electrical joining of the electrode/wire. The joining portion has favorable electrical conductivity and reliability. Solder joining is also often used for heat dissipation joining of a power semiconductor module or the like in addition to the aforementioned electrical conductive joining.

Recently, there has been a trend to change the material of the electrode/wire from noble metal to aluminum (Al) or its alloy because of a strong demand for a reduction in weight and cost of the electrical/electronic equipment. However, the Al and an Al alloy tend to form a chemically stable oxide film on their surface and thus have low solder wettability. Therefore, there is a problem that it is difficult to ensure highly electrical conductive and reliable joining by solder joining. Thus, when the Al or an Al alloy is used as a material of the electrode/wire, conventionally, electrical conductive joining is often carried out by swage joining, ultrasonic joining, or the like. However, the swage joining or the ultrasonic joining has a drawback of being inferior to the solder joining in terms of workability, mass productivity, and long-term reliability.

Given the above background, various types of new electrical conductive joining that can ensure electrical conductivity comparable to that of the solder joining with respect to noble metal even in the case of a hard-to-solder joinable metal, e.g., Al, have been studied. For example, Patent Literature 1 (JP 2014-184474 A) teaches a joining material including a vanadium oxide-containing low-melting glass and electrical conductive particles (metal particles), as an electrical conductive joint material that replaces a solder material of conventional art. According to Patent Literature 1, the use of such joining material enables joining of an electric wire of aluminum or an aluminum alloy to a joined metal with electrically and mechanically high connection reliability.

CITATION LIST

Patent Literature

Patent Literature 1: JP 2014-184474 A

SUMMARY OF THE INVENTION

Problems to be Solved by the Invention

The joining material disclosed in Patent Literature 1 is understood to exhibit favorable mechanical joinability and electrical joinability as a material for joining hard-to-solder joinable metals, e.g., Al. However, according to the comparison between the electrical joinability (e.g., connection resistance) in Patent Literature 1 and the electrical joinability obtained when easy-to-solder joinable metals (e.g., copper) are solder-joined, it cannot be said that in Patent Literature 1, sufficiently low electrical resistance connection (joining with low connection resistance) is achieved. And then, further low electrical resistance connection has been required.

In view of forgoing, it is an objective of the present invention to provide a conductive joint article exhibiting electrical joinability comparable to that of solder joining of easy-to-solder joinable metals even when a joined member of the conductive joint article is made of a hard-to-solder joinable metal, and to provide a method for manufacturing the conductive joint article.

Solution to Problems (I) According to one aspect of the present invention, there is provided a conductive joint article with conductive joined members electrically joined via a joining layer, at least one of the joined members being made of a hard-to-solder joinable metal. The joining layer includes an oxide glass phase and a conductive metal phase. The oxide glass phase includes vanadium as a major constituent and at least one of phosphorus, barium and tungsten as an accessory constituent, and has a glass transition point of 390° C. or less. And, electrical connection resistance between the joined members exhibits less than $1 \times 10^{-5}$ $\Omega/mm^2$.

In the above aspect (I) of the invention, the following modifications and changes can be made.

(i) The hard-to-solder joinable metal may be a light metal or a composite material including the light metal.

(ii) The light metal may be aluminum, an aluminum alloy and/or a magnesium alloy.

(iii) The oxide glass phase may further include tellurium and/or silver as a major constituent, and have a glass transition point of 355° C. or less.

(iv) The oxide glass phase may further include at least one of yttrium, lanthanum, iron and aluminum as an accessory constituent, and have a glass transition point of 200° C. or less.

(v) The conductive metal phase may be made of at least one of gold, silver, copper, aluminum, nickel, tin, zinc and an alloy including one of them as a main constituent.

(vi) The joining layer may include 10% by volume or more and 95% by volume or less of the conductive metal phase and a balance of the oxide glass phase.

(II) According to another aspect of the present invention, there is provided a method for manufacturing a conductive joint article. The conductive joint article is with conductive joined members electrically joined via a joining material, at least one of the joined members being made of a hard-to-solder joinable metal, electrical connection resistance between the joined members being less than $1 \times 10^{-3}$ $\Omega/mm^2$. The joining material includes an oxide glass that contains a vanadium oxide as a major constituent and at least one of a phosphorus oxide, a barium oxide and a tungsten oxide as an accessory constituent when nominal constituents thereof are expressed in terms of oxide, and that has a glass transition point of 390° C. or less. The method for manufacturing the conductive joint article includes: a joining material preparation step of preparing the joining material; and a joined member joining treatment step of interposing the joining material between the joined members and carrying out resistance welding.

In the above aspect (II) of the invention, the following modifications and changes can be made.

(vii) Resistance welding conditions of the joined member joining treatment step may be such that an applied current density is 80 A/mm$^2$ or more and 360 A/mm$^2$ or less and current application duration is 10 ms or more and 100 ms or less.

(viii) Resistance welding conditions of the joined member joining treatment step may be such that a pressing stress on the joined member is 8 MPa or more and 15 MPa or less.

(ix) The hard-to-solder joinable metal may be a light metal or a composite material including the light metal.

(x) The light metal may be aluminum, an aluminum alloy, and/or a magnesium alloy.

(xi) The oxide glass of the joining material may further contain a silver oxide as a major constituent, have a glass transition point of 355° C. or less, but not be provided with metal particles.

(xii) The oxide glass of the joining material may further contain a tellurium oxide as a major constituent, have a glass transition point of 355° C. or less, and be mixed with metal particles.

(xiii) The metal particle may be made of at least one of gold, silver, copper, aluminum, nickel, tin, zinc and an alloy including one of them as a main constituent, and when a total volumetric percentage of the oxide glass and the metal particle in the joining material may be 100% by volume, the percentage of the metal particle may be 10% by volume or more and 95% by volume or less.

(xiv) The oxide glass of the joining material may further contain at least one of a yttrium oxide, a lanthanum oxide, an iron oxide and an aluminum oxide as an accessory constituent, and have a glass transition point of 200° C. or less.

Advantages of the Invention

According to the present invention, it is possible to provide a conductive joint article exhibiting electrical joinability comparable to that of solder joining of easy-to-solder joinable metals even when a joined member of the conductive joint article is made of a hard-to-solder joinable metal, and a method for manufacturing the conductive joint article.

DETAILED DESCRIPTION OF THE PREFERRED EMBODIMENTS

Basic Idea of the Present Invention

Figure 1:
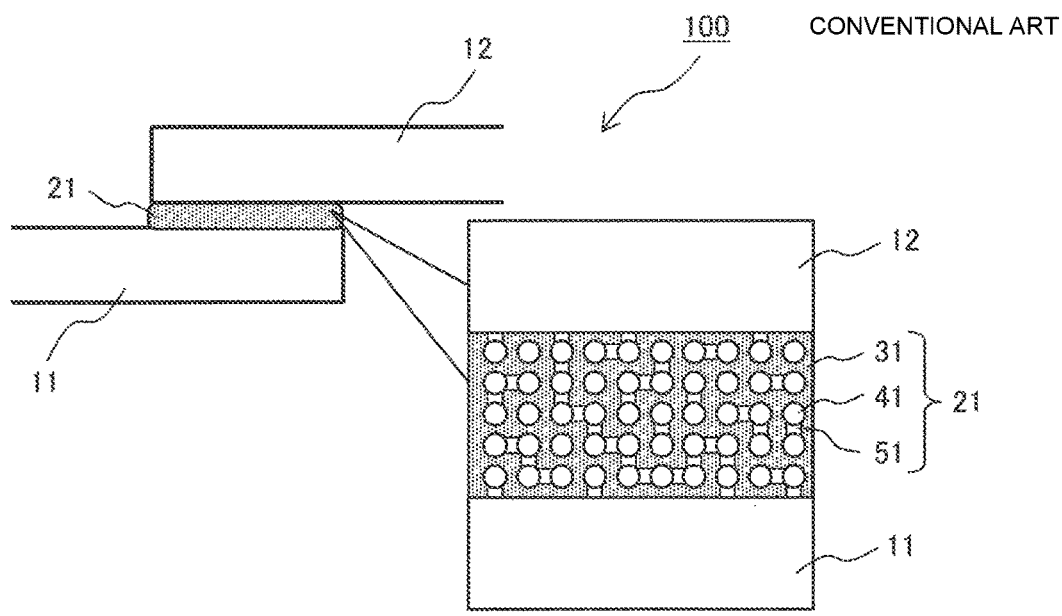
FIG. 1 is a schematic illustration showing a cross-sectional view and a partially enlarged cross-sectional view of an exemplary conductive joint article of conventional art using a joining material including a low-melting glass and electrical conductive particles.

As described above, the joining material disclosed in Patent Literature 1 (JP 2014-184474 A) exhibits favorable mechanical joinability as a material for joining hard-to-solder joinable metals, e.g., Al. However, regarding the electrical joinability (e.g., connection resistance), it cannot be said that joining with sufficiently low connection resistance is achieved as compared with solder joining of easy-to-solder joinable metals, e.g., Cu.

In order to clarify the causes, the present inventors have researched and studied, in further detail, the compositions of low-melting glass, the type and mixing ratio of metal particles to be mixed, the heat treatment conditions, and the microstructure of a joining layer according to the technique of Patent Literature 1. As a result, according to the technique of Patent Literature 1, metal particles after heat treatment are randomly bonded, so that there is a possibility that the formation of a conductive path for electrically connecting joined members is relatively small.

Thus, the inventors have intensively researched techniques capable of fully forming a conductive path for electrically joining joined members on the basis of the aforementioned knowledge. As a result, it has been found that, when metal members to be joined via a joining material including predetermined low-melting glass are resistance-welded, a large number of electrical conductive paths connecting the metal members joined are formed, thereby, drastically decreasing the connection resistance between the joined members. Besides, such the large number of electrical conductive paths cannot be obtained by the heat treatment (simple heating) of Patent Literature 1. The present invention has been made on the basis of the above technical findings.

Preferred embodiments of the present invention will be described in detail below with reference to the accompanying drawings. However, the invention is not limited to the specific embodiments described herein, but various combinations and modifications are possible without departing from the spirit and scope of the invention. In addition, like members and portions may be designated with like reference numerals and duplicate description may be omitted.

(Conductive Joint Article)

As described above, the inventors have minutely observed a large number of microstructures of the joining layer of the conductive joint article of the conventional art and the conductive joint article of the invention. As a result, the matter described below has been clarified. FIG. 1 is a schematic illustration showing a cross-sectional view and a partially enlarged cross-sectional view of an exemplary conductive joint article of conventional art using a joining material including a low-melting glass and electrical conductive particles. A conductive joint article 100 of the conventional art illustrated in FIG. 1 has been subjected to heat treatment according to the description of Patent Literature 1. As shown in FIG. 1, regarding the conductive joint article 100 of the conventional art, conductive joined members 11 and 12 are electrically joined via a joining layer 21, the joining layer 21 includes a low-melting glass phase 31, which is a matrix, and electrical conductive particles 41 dispersed therein.

In the joining layer 21, the electrical conductive particles 41, and the electrical conductive particles 41 and the joined members 11 and 12 are understood to be bonded via a conductive bonding phase 51, so that the joined members 11 and 12 are conductively joined. However, the bonding of the electrical conductive particles 41 does not indicate any particular orientations (the electrical conductive particles 41 are randomly bonded). It is also observed that a group of the bonded electrical conductive particles 41 is disconnected or is isolated in an island shape in the low-melting glass phase 31 which is the matrix (in other words, the coupling among the groups of the bonded electrical conductive particles 41 is often broken).

Figure 2:
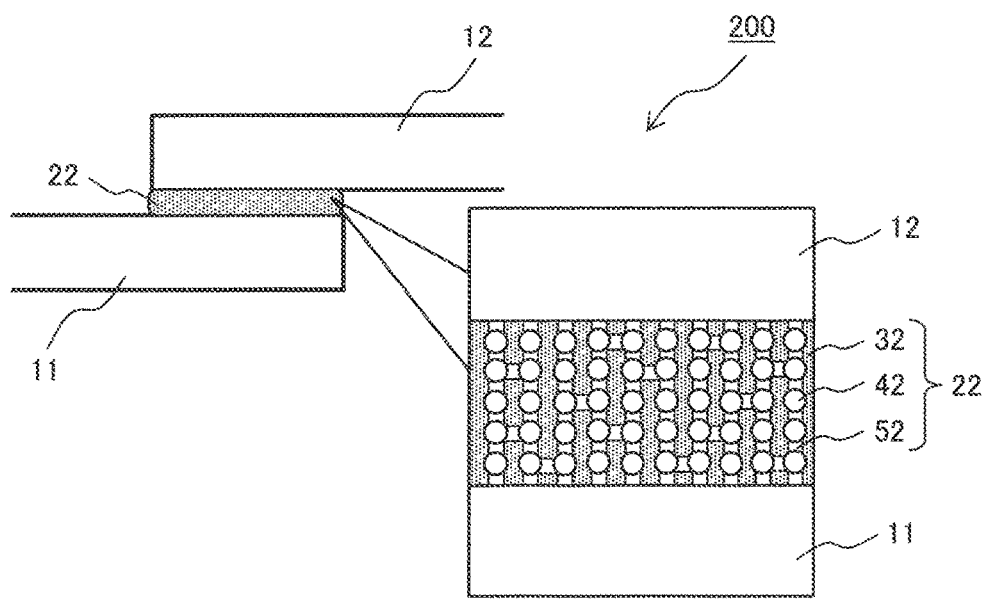
FIG. 2 is a schematic illustration showing a cross-sectional view and a partially enlarged cross-sectional view of an exemplary conductive joint article according to the present invention.

FIG. 2 is a schematic illustration showing a cross-sectional view and a partially enlarged cross-sectional view of an exemplary conductive joint article according to the present invention. A conductive joint article 200 of the invention illustrated in FIG. 2 has been subjected to joining treatment by resistance welding according to a manufacturing method of the invention described below. As shown in FIG. 2, similarly, regarding the conductive joint article 200 of the invention, joined members 11 and 12 are electrically joined via a joining layer 22. The joining layer 22 includes a predetermined oxide glass phase 32, which is a matrix, and particulate conductive metal phases 42 dispersed therein. These points mentioned above are similar to the conductive joint article 100 of the conventional art.

In contrast, the microstructure of the joining layer 22 is different from that of the joining layer 21 of the conductive joint article 100 of the conventional art. Specifically, it is observed on many occasions that the particulate conductive metal phases 42 are coupled via conductive bonding phases 52 to line up in the direction of the joined members 11 and 12 and that the conductive metal phases 42 and the joined members 11 and 12 are bonded via the conductive bonding phases 52. In other words, the particulate conductive metal phases 42 are understood to be daisy-chained in the direction of the joined members 11 and 12 in the 41 32, which is the matrix, to form a large number of conductive paths between the joined members 11 and 12.

As a result, the conductive joint article 200 of the invention can drastically reduce the connection resistance between the joined members 11 and 12 as compared with the conventional art. Specifically, measurement of the connection resistance of the conductive joint article 200 exhibits that the connection resistance between the joined members 11 and 12 is less than $1 \times 10^{-3}$ $\Omega/mm^2$ ($10^{-6}$ $\Omega/mm^2$ order). The connection resistance of this level is comparable to the level of the connection resistance obtained by solder joining of easy-to-solder joinable metals, e.g., Cu.

Meanwhile, in FIG. 2, a pair of joined members is illustrated for the sake of simplicity of description. However, the present invention is not limited thereto, but three or more joined members may be joined together to form the conductive joint article.

(Method for Manufacturing Conductive Joint Article)

Next, a configuration and characteristic of the invention are described in further detail according to a method for manufacturing the conductive joint article.

(1) Joined Member

First, Conductive joined members are prepared. In the invention, there is no particular limitation on the material of the joined members 11 and 12 insofar as the material has electrical conductivity. However, according to the gist of the invention, it is technically significant that at least one of the joined members 11 and 12 is made of a hard-to-solder joinable metal. The hard-to-solder joinable metal means a metal (e.g., light metal or a composite material including the light metal) on which a chemically stable oxide film is easily formed. Representative examples include Al, an Al alloy, magnesium (Mg), an Mg alloy, titanium (Ti), a Ti alloy, and a composite material including one of them.

(2) Joining Material

A joining material for forming the joining layer 22 is prepared. The joining material used in the invention includes predetermined oxide glass for forming the oxide glass phase 32. The oxide glass, when its nominal composition is expressed in terms of oxide, invariably contains $V_2O_3$ as a major constituent and contains at least one of $P_2O_3$, BaO and $WO_3$ as an accessory constituent. The oxide glass is a glass indicating a glass transition point of 390° C. or less.

$V_2O_3$, which is a major constituent, is a constituent that contributes to a reduction in temperature at which the glass softens and fluidizes. In general, when the temperature at which a glass softens and fluidizes is decreased, crystallization also tends to occur easily. However, from the viewpoint of characteristics (e.g., fluidity, adhesiveness, and joining strength) required as the joining material, crystallization of glass is not favorable. Therefore, as a constituent contributing to suppression of crystallization of glass, the aforementioned accessory constituent (at least one of $P_2O_3$, BaO, and $WO_3$) is contained. The oxide glass has semiconducting electric property. The oxide glass has an effect of reducing and/or removing an oxide film formed on the surface of the joined members 11 and 12 when softened and fluidized to form the joining layer 22.

In addition, it is preferable that the oxide glass further contains $TeO_2$ and/or $Ag_2O$ as a major constituent and has a glass transition point of 355° C. or less. The $TeO_2$ constituent is a constituent that contributes to vitrification of an oxide, suppression of crystallization of glass, and a reduction in temperature at which glass softens and fluidizes. The $Ag_2O$ constituent is a constituent that makes a great contribution to a reduction in temperature at which glass softens and fluidizes, contributes to formation of the conductive bonding phase 52 when the oxide glass is softened and fluidized to form the joining layer 22, and forms the conductive metal phase 42 itself.

Furthermore, it is more preferable that the oxide glass further contains at least one of $Y_2O_3$, $La_2O_3$, $Fe_2O_e$ and $Al_2O_3$, as an accessory constituent and has a glass transition point of 200° C. or less. The above constituents even in a small amount have a large effect of suppressing crystallization of glass. Therefore, the blending ratio of the major constituent can be increased, enabling a reduction in temperature (e.g., glass transition point) at which glass softens and fluidizes.

There is no particular limitation on a preparation method for the oxide glass, but a conventional method may be used. For example, a predetermined amount of glass raw material is weighed and mixed, and is then heat-melted, cooled and pulverized to prepare desired oxide glass powder.

The joining material used in the invention is preferably mixed with metal particles for forming the conductive metal phase 42. It is preferable that the metal particles have favorable electrical conductivity, have high wettability with respect to the oxide glass phase 32, and are suitable for forming the conductive bonding phase 52. For example, Au, Ag, Cu, Al, Ni, Sn, Zn, and an alloy including one of them as a main constituent may be used preferably. Meanwhile, when the oxide glass contains $Ag_2O$ as a major constituent (particularly, when $Ag_2O$ is contained in the largest amount among the major constituents), the metal particles may not be mixed as the joining material (i.e., mixing of metal particles are not essential).

In the case where the metal particles are mixed as the joining material, when the total volumetric percentage of the oxide glass and the metal particles is 100% by volume, it is preferable that the percentage of the metal particles is 10% by volume or more and 95% by volume or less and the balance is the oxide glass (the percentage of the oxide glass is 5% by volume or more and 90% by volume or less). It is more preferable that the percentage of the metal particles is 50% by volume or more and 90% by volume or less and the percentage of the oxide glass is 10% by volume or more and 50% by volume or less.

When the percentage of the oxide glass is less than 5% by volume, the oxide film on the surface of the joined members 11 and 12 when joined is reduced and removed insufficiently, and sufficient adhesiveness cannot be obtained. In the case where the oxide glass does not contain $Ag_2O$ as a major constituent, when the percentage of the metal particles is less than 10% by volume, the electrical conductive path is formed insufficiently (connection resistance between the joined members 11 and 12 is not decreased sufficiently). Meanwhile, when the oxide glass contains $Ag_2O$ as a major constituent, as described above, the percentage of the metal particles may be less than 10% by volume.

The joining material may be in the form of a simple mixture of an oxide glass powder and metal particles, but is preferably a paste or a preform from the viewpoint of joining workability. There is no particular limitation on a method for preparing a paste or a preform, and a conventional method may be used.

For example, a joining paste material may be prepared when the oxide glass powder, the metal particles, a binder (e.g., ethyl cellulose, nitrocellulose, and modified polyphenylene ether), and a solvent (e.g., butyl carbitol acetate, α-terpineol, and isobornyl cyclohexanol) are mixed and kneaded. A joining preform material may be provided when the oxide glass powder, the metal particles, a binder, and a solvent are mixed and kneaded into the form of clay, which is then shaped into a sheet and the solvent is evaporated.

(3) Joining Treatment

Figure 3:
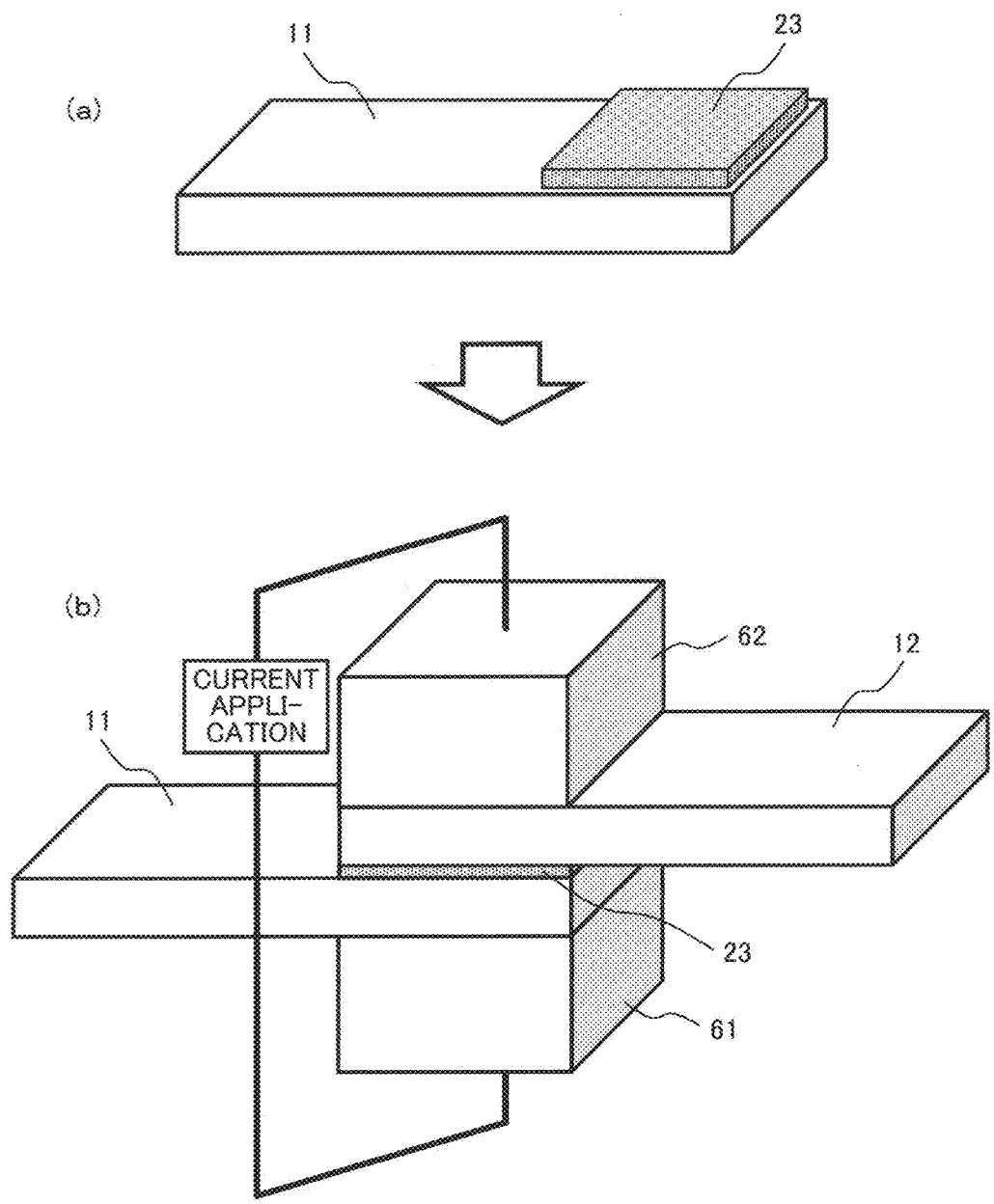
FIG. 3 is a schematic illustration showing perspective views of a joined member joining treatment process according to a method for manufacturing a conductive joint article of the present invention.

A joined member joining treatment process is a step that carries out resistance welding with the joining material being interposed between the joined members. FIG. 3 is a schematic illustration showing perspective views of a joined member joining treatment process according to a method for manufacturing a conductive joint article of the invention. As shown in FIG. 3(a), a joining material 23 is disposed on at least one of joining surfaces of the joined members 11 and 12. More specifically, when the joining material 23 is a joining paste material, the joining paste material is applied to the joining surface of the joined member, and the solvent constituent is evaporated. After the joining paste material is applied and dried, it may be fired into the form of a baked coating film as necessary. When the joining material 23 is a joining preform material, it is sufficient to be placed on the joining surface of the joined member.

Next, as shown in FIG. 3(b), the joined members 11 and 12 are disposed to sandwich the joining material 23, and resistance welding electrodes 61 and 62 are disposed to sandwich the joined members 11 and 12. Then, resistance welding is carried out by applying current between the resistance welding electrodes 61 and 62 while the resistance welding electrodes 61 and 62 press the joined members 11 and 12.

As resistance welding conditions, an applied current density is preferably 80 $A/mm^2$ or more and 360 $A/mm^2$ or less, and current application duration is preferably 10 ms or more and 100 ms or less. When the applied current density is less than 80 $A/mm^2$ and/or the current application duration is less than 10 ms, the joining material 23 is insufficiently softened and fluidized (practically, softening and fluidization of the oxide glass are insufficient), and then sufficient electrical conductive joining (sufficiently low connection resistance) cannot be obtained. When the applied current density exceeds 360 $A/mm^2$ and/or the current application duration exceeds 100 ms, the joined members 11 and 12 are prone to be deformed and melted due to overheating, and a spark occurs to cause damage to the resistance welding electrodes 61 and 62. Herein, the applied current density is defined as a quotient obtained when an applied current value is divided by a joining area.

In addition, the pressing condition of the resistance welding technically depends on the material of the joined members 11 and 12. When Al is used as the joined member, 8 MPa or more and 15 MPa or less is preferable. When the pressing condition is less than 8 MPa, the mechanical joinability becomes insufficient. When the pressing condition exceeds 15 MPa, the Al joined member is prone to be deformed.

The conductive joint article 200 according to the invention illustrated in FIG. 2 can be obtained by the aforementioned process. The connection resistance between the joined members 11 and 12 of the resultant conductive joint article 200 exhibits less than $1 \times 10^{-5}$ $\Omega/mm^2$ ($10^{-6}$ $\Omega/mm^2$ order).

EXAMPLES

The present invention will be described below in further detail on the basis of examples. However, the invention is not limited to the specific examples described herein, but may include their variations.

Experimental 1

In the present experimental, oxide glasses having various nominal compositions were prepared, and the physical properties (characteristic temperature and density) of the oxide glasses were studied.

(Preparation of Oxide Glasses)

The oxide glasses (VG-01 to VG-45) having nominal compositions indicated in Tables 1 and 2 described below was prepared. The nominal compositions in the Tables are indicated by weight ratio in terms of oxide of each constituent. As starting materials, except for a Ba source, oxide powder (purity of 99.9%) manufactured by Kojundo Chemical Laboratory Co., Ltd. was used. As a Ba source, barium carbonate ($BaCO_3$, purity of 99.9%) was used. As can be seen from the purity of the starting materials, the oxide glasses prepared according to the invention contains a certain amount of inevitable impurities.

TABLE 1

Nominal compositions of oxide glasses (No. 1).

| Oxide Glass | Nominal Composition of Oxide Glass (Weight %) | | | | | | | | | |
|---|---|---|---|---|---|---|---|---|---|---|
| | $V_2O_5$ | $TeO_2$ | $Ag_2O$ | $P_2O_5$ | $BaO$ | $WO_3$ | $Y_2O_3$ | $La_2O_3$ | $Fe_2O_3$ | $Al_2O_3$ |
| VG-01 | 40.0 | — | — | 20.0 | 30.0 | 10.0 | — | — | — | — |
| VG-02 | 45.0 | — | — | 20.0 | 25.0 | 10.0 | — | — | — | — |
| VG-03 | 45.0 | — | — | 15.0 | 30.0 | 10.0 | — | — | — | — |
| VG-04 | 50.0 | — | — | 19.0 | 21.0 | 10.0 | — | — | — | — |
| VG-05 | 35.0 | 30.0 | — | 12.0 | 13.0 | 10.0 | — | — | — | — |
| VG-06 | 39.0 | 30.0 | — | 13.0 | 19.0 | — | — | — | — | — |
| VG-07 | 39.0 | 30.0 | — | — | 17.0 | 13.0 | — | — | — | — |
| VG-08 | 40.0 | 20.0 | — | 10.0 | 20.0 | 10.0 | — | — | — | — |
| VG-09 | 40.0 | 25.0 | — | 7.0 | 18.0 | 10.0 | — | — | — | — |
| VG-10 | 40.0 | 30.0 | — | 5.0 | 15.0 | 10.0 | — | — | — | — |
| VG-11 | 40.0 | 30.0 | — | 5.0 | 10.0 | 15.0 | — | — | — | — |
| VG-12 | 40.0 | 30.0 | — | 9.0 | 9.0 | 12.0 | — | — | — | — |
| VG-13 | 45.0 | 5.0 | — | 17.0 | 23.0 | 10.0 | — | — | — | — |
| VG-14 | 45.0 | 10.0 | — | 17.0 | 18.0 | 10.0 | — | — | — | — |
| VG-15 | 45.0 | 15.0 | — | 15.0 | 15.0 | 10.0 | — | — | — | — |
| VG-16 | 45.0 | 25.0 | — | 10.0 | 10.0 | 10.0 | — | — | — | — |
| VG-17 | 45.0 | 30.0 | — | — | 15.0 | 10.0 | — | — | — | — |
| VG-18 | 45.0 | 35.0 | — | — | 20.0 | — | — | — | — | — |
| VG-19 | 47.0 | 30.0 | — | 13.0 | — | — | — | — | 10.0 | — |
| VG-20 | 49.0 | 30.0 | — | 13.0 | — | — | — | — | 8.0 | — |
| VG-21 | 50.0 | 10.0 | — | 15.0 | 15.0 | 10.0 | — | — | — | — |
| VG-22 | 50.0 | 15.0 | — | 15.0 | 15.0 | 5.0 | — | — | — | — |
| VG-23 | 20.0 | — | 50.0 | 21.0 | 4.0 | — | — | — | — | — |
| VG-24 | 22.0 | — | 47.0 | 31.0 | — | — | — | — | — | — |
| VG-25 | 25.0 | — | 50.0 | 25.0 | — | — | — | — | — | — |
| VG-26 | 40.0 | — | 20.0 | 25.0 | 5.0 | 10.0 | — | — | — | — |
| VG-27 | 45.0 | — | 20.0 | 25.0 | 10.0 | — | — | — | — | — |

TABLE 2

Nominal compositions of oxide glasses (No. 2).

| Oxide Glass | Nominal Composition of Oxide Glass (Weight %) | | | | | | | | | |
|---|---|---|---|---|---|---|---|---|---|---|
| | $V_2O_5$ | $TeO_2$ | $Ag_2O$ | $P_2O_5$ | $BaO$ | $WO_3$ | $Y_2O_3$ | $La_2O_3$ | $Fe_2O_3$ | $Al_2O_3$ |
| VG-28 | 17.0 | 30.0 | 38.0 | 5.0 | — | 10.0 | — | — | — | — |
| VG-29 | 17.0 | 30.0 | 38.0 | 5.0 | 5.0 | 5.0 | — | — | — | — |
| VG-30 | 25.0 | 30.0 | 30.0 | 10.0 | — | — | — | — | 5.0 | — |
| VG-31 | 30.0 | 20.0 | 5.0 | 15.0 | 15.0 | 10.0 | — | — | 5.0 | — |
| VG-32 | 40.0 | 25.0 | 15.0 | 10.0 | 10.0 | — | — | — | — | — |
| VG-33 | 17.0 | 30.0 | 43.0 | — | 5.0 | 5.0 | — | — | — | — |
| VG-34 | 19.0 | 32.0 | 44.0 | — | 4.0 | 1.0 | — | — | — | — |
| VG-35 | 19.0 | 33.0 | 48.0 | — | — | — | — | — | — | — |
| VG-36 | 19.0 | 34.0 | 37.0 | — | 4.0 | 6.0 | — | — | — | — |
| VG-37 | 20.0 | 30.0 | 40.0 | — | — | 10.0 | — | — | — | — |
| VG-38 | 20.0 | 33.0 | 45.0 | — | — | 2.0 | — | — | — | — |
| VG-39 | 17.0 | 30.0 | 38.0 | — | — | 5.0 | — | — | 5.0 | — |
| VG-40 | 19.0 | 30.0 | 39.0 | — | 5.0 | 6.0 | 0.5 | 0.5 | — | — |
| VG-41 | 19.0 | 31.0 | 42.2 | — | 4.0 | 3.0 | 0.2 | 0.4 | — | 0.2 |
| VG-42 | 19.0 | 32.0 | 43.5 | — | 4.0 | 1.0 | — | 0.5 | — | — |
| VG-43 | 19.0 | 32.0 | 43.6 | — | 4.0 | 1.0 | 0.4 | — | — | — |
| VG-44 | 19.0 | 32.0 | 43.7 | — | 4.0 | 1.0 | — | — | 0.3 | — |
| VG-45 | 19.0 | 32.0 | 43.8 | — | 4.0 | 1.0 | — | — | — | 0.2 |

The powders of the starting materials were mixed to correspond to the weight ratios indicated in the Tables and each of the resultant mixtures was put into a distinct platinum crucible. When the ratio of $Ag_2O$ in the raw material is 40% by weight or more, a quartz crucible was used. During mixing, in consideration of prevention of undesired moisture absorption by the raw material powder, a metallic spoon was used to perform mixing in the crucible.

The crucible containing the raw material mixture powder was set in a glass melting furnace, followed by heating and melting. The temperature was increased at a rate of 10° C./min, the molten glass at setting temperatures (700 to 900° C.) was stirred and held for two hours. Then, the crucible was removed from the glass melting furnace, and the molten glass was poured into a stainless steel mold, which had been preheated to 150 to 200° C. Next, the cast glass was transferred to a strain relieving furnace, which had been preheated to strain relieving temperatures, was held for one hour to remove strain and then cooled to room temperatures at a rate of 1° C./min. The glass cooled to room temperatures was pulverized to produce the powder of the oxide glass having the nominal composition indicated in the Tables.

(Measurement of Characteristic Temperature and Density)

The oxide glass powders obtained above were measured with respect to characteristic temperature and density. The characteristic temperature was measured by differential thermal analysis (DTA) to measure glass transition point $T_g$, yield point $M_g$, softening point $T_s$, and crystallization temperature $T_{cry}$. The DTA measurement was carried out under the conditions that a referential sample (α-alumina) and a measurement sample both had a weight of 650 mg, and a temperature increase rate was 5° C./min in air. The density was measured by fixed volume expansion method. The results are shown in Tables 3 and 4 described later.

Figure 4:
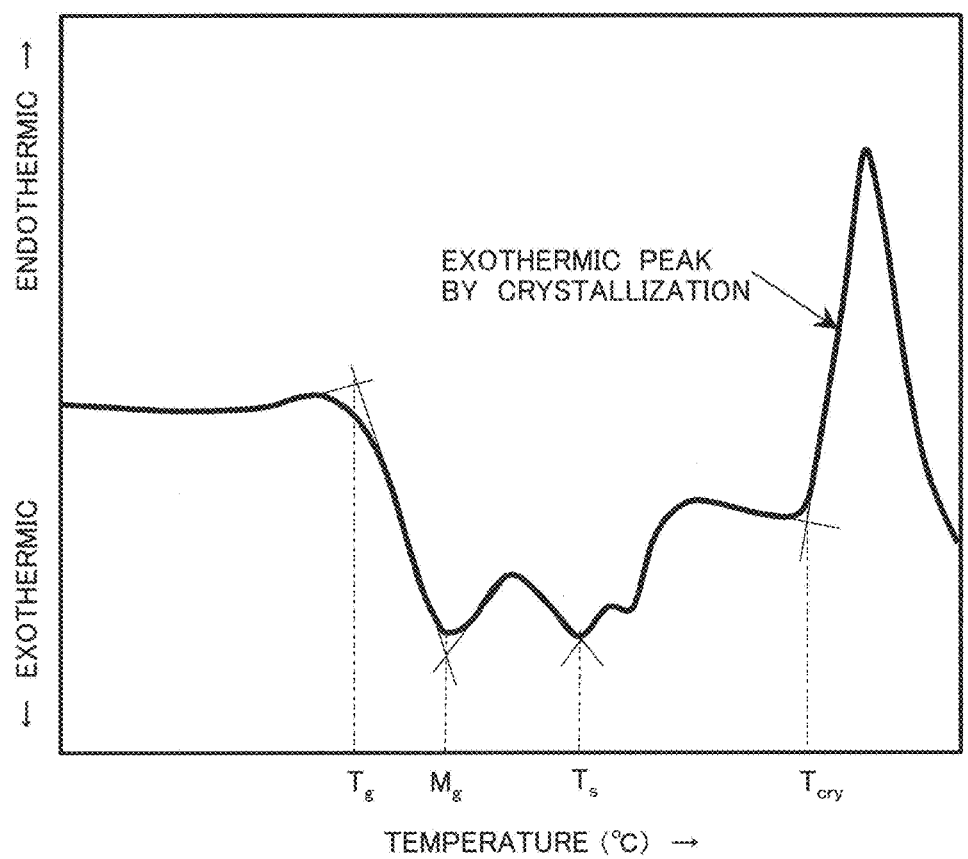
FIG. 4 shows an exemplary chart (DTA curve) obtained in a temperature increase process of differential thermal analysis (DTA) with respect to representative oxide glass used in the present invention.

The characteristic temperature of the glass is briefly described. FIG. 4 shows an exemplary chart (DTA curve) obtained in a temperature increase process of differential thermal analysis (DTA) with respect to representative oxide glass used in the invention. As shown in FIG. 4, the onset temperature of the first endothermic peak is the glass transition point $T_g$, the first endothermic peak temperature is the yield point $M_g$, the second endothermic peak temperature is the softening point $T_s$, and the onset temperature of an exothermic peak is the crystallization temperature $T_{cry}$. In addition, each of the $T_g$, $M_g$ and $T_s$ is also defined by viscosity. The $T_g$ corresponds to a temperature at which a viscosity of $10^{13.3}$ poise is obtained, the $M_g$ corresponds to a temperature at which a viscosity of $10^{11.0}$ poise is obtained, and the $T_s$ corresponds to a temperature at which a viscosity of $10^{7.65}$ poise is obtained.

The lower the characteristic temperatures, $T_g$, $M_g$ and $T_s$, the easier the glass softens and fluidizes at low temperatures, enabling joining at low temperatures. Joining with the glass is carried out generally at a temperature 20 to 60° C. higher than the $T_s$. When the glass is crystallized, however, the softening and fluidity property of the glass decreases significantly, and the joining strength is also greatly degraded. Therefore, normally, joining is performed at a temperature of less than the $T_{cry}$. Given the above, in the case of glass joining, it can be said that glass having lower $T_s$ and higher $T_{cry}$ is easy to use and effective for joining at low temperatures.

TABLE 3

Characteristic temperatures and densities of oxide glasses (No. 1).

| Oxide Glass | Glass Transition Point $T_g$ | Yield Point $M_g$ | Softening Point $T_s$ | Crystallization Temperature $T_{cry}$ | Density d (g/cm³) |
|---|---|---|---|---|---|
| VG-01 | 388 | 412 | 464 | >550 | 3.89 |
| VG-02 | 371 | 395 | 446 | >550 | 3.77 |
| VG-03 | 352 | 374 | 419 | >550 | 3.94 |
| VG-04 | 350 | 378 | 427 | >550 | 3.63 |
| VG-05 | 319 | 349 | 395 | >550 | 3.78 |
| VG-06 | 325 | 345 | 385 | >550 | 3.90 |
| VG-07 | 285 | 295 | 334 | >550 | 4.40 |
| VG-08 | 319 | 344 | 389 | >550 | 4.14 |
| VG-09 | 307 | 326 | 373 | >550 | 4.20 |
| VG-10 | 295 | 314 | 357 | >550 | 4.27 |
| VG-11 | 286 | 308 | 349 | 453 | 4.27 |
| VG-12 | 292 | 319 | 365 | >550 | 4.13 |
| VG-13 | 352 | 370 | 426 | >550 | 3.81 |
| VG-14 | 335 | 363 | 421 | >550 | 3.75 |
| VG-15 | 324 | 349 | 400 | >550 | 3.80 |
| VG-16 | 291 | 316 | 364 | >550 | 4.03 |
| VG-17 | 282 | 295 | 331 | >550 | 4.18 |
| VG-18 | 270 | 285 | 310 | >550 | 4.26 |
| VG-19 | 293 | 314 | 364 | >500 | 3.58 |
| VG-20 | 287 | 309 | 352 | 426 | 3.51 |
| VG-21 | 313 | 341 | 392 | >550 | 3.69 |
| VG-22 | 308 | 335 | 384 | >550 | 3.68 |
| VG-23 | 266 | 282 | 326 | 417 | 4.87 |
| VG-24 | 296 | 309 | 360 | 467 | 4.44 |

TABLE 3-continued

Characteristic temperatures and densities of oxide glasses (No. 1).

| Oxide Glass | Glass Transition Point $T_g$ | Yield Point $M_g$ | Softening Point $T_s$ | Crystallization Temperature $T_{cry}$ | Density d (g/cm³) |
|---|---|---|---|---|---|
| VG-25 | 279 | 292 | 333 | 375 | 4.53 |
| VG-26 | 338 | 362 | 428 | >550 | 3.85 |
| VG-27 | 313 | 340 | 384 | 466 | 3.74 |

TABLE 4

Characteristic temperatures and densities of oxide glasses (No. 2).

| Oxide Glass | Glass Transition Point $T_g$ | Yield Point $M_g$ | Softening Point $T_s$ | Crystallization Temperature $T_{cry}$ | Density d (g/cm³) |
|---|---|---|---|---|---|
| VG-28 | 221 | 239 | 274 | >400 | 5.58 |
| VG-29 | 197 | 214 | 260 | >400 | 5.54 |
| VG-30 | 266 | 291 | 332 | >450 | 5.11 |
| VG-31 | 351 | 381 | 432 | 546 | 4.23 |
| VG-32 | 274 | 295 | 339 | 385 | 4.26 |
| VG-33 | 177 | 192 | 233 | 390 | 5.77 |
| VG-34 | 170 | 185 | 219 | 264 | 5.73 |
| VG-35 | 153 | 168 | 198 | 254 | 5.75 |
| VG-36 | 189 | 207 | 240 | 335 | 5.62 |
| VG-37 | 189 | 202 | 241 | 330 | 5.56 |
| VG-38 | 169 | 179 | 215 | 284 | 5.65 |
| VG-39 | 234 | 263 | 303 | >450 | 5.62 |
| VG-40 | 190 | 212 | 247 | >400 | 5.65 |
| VG-41 | 174 | 196 | 231 | >400 | 5.68 |
| VG-42 | 168 | 189 | 220 | >400 | 5.71 |
| VG-43 | 168 | 186 | 222 | >400 | 5.70 |
| VG-44 | 170 | 187 | 222 | >400 | 5.70 |
| VG-45 | 171 | 187 | 223 | >400 | 5.71 |

Each of VG-01 to VG-04 is an oxide glass made of $V_2O_3$ as a major constituent. Among VG-01 to VG-45, each of VG-01 to VG-04 exhibits relatively higher characteristic temperatures. It can be said that VG-01 to VG-04 have characteristic temperatures comparable to those of commercially available PbO—$B_2O_3$-based low-melting glass (in one example, $T_s$=402° C.) and $Bi_2O_3$—$B_2O_3$-based low-melting glass (in one example, $T_s$=445° C.)

Each of VG-05 to VG-22 is an oxide glass made of $V_2O_3$ and $TeO_2$ as major constituents. Each of VG-05 to VG-22 has lower $T_g$, $M_g$ and $T_s$ characteristic temperatures than VG-01 to VG-04, and is expected to enable joining at lower temperatures. In particular, VG-07, VG-17 and VG-18, which are free of $P_2O_5$, have very low $T_s$. VG-11 and VG-20 are understood to have a crystallization peak in a DTA curve. However, this is not a particular problem because there is a sufficiently large temperature difference between $T_{cry}$ and $T_s$. In addition, VG-13 to VG-15, which have a low $TeO_2$ content and a high $P_2O_5$ content, are substantially equivalent in $T_s$ to VG-01 to VG-04 (but, have lower $T_g$ and $M_g$).

Each of VG-23 to VG-27 is an oxide glass made of $V_2O_3$ and $Ag_2O$ as major constituents. Each of VG-23 to VG-27 has lower characteristic temperatures than VG-01 to VG-04. VG-23 to VG-25 and VG-27 are understood to have a crystallization peak in a DTA curve. However, this is not a particular problem because there is a sufficiently large temperature difference between $T_{cry}$ and $T_s$.

Each of VG-28 to VG-45 is an oxide glass made of $V_2O_3$, $TeO_2$ and $Ag_2O$ as major constituents. Except for VG-31 having a relatively small $Ag_2O$ content, each of VG-28 to VG-45 has very low characteristic temperatures and is expected to enable joining at lower temperatures. In particular, each of VG-40 to VG-45, which has at least one of $Y_2O_3$, $La_2O_3$, $Fe_2O_e$ and $Al_2O_3$ as an accessory constituent and has an increased major constituent content, has very low characteristic temperatures, and is understood to enable joining at lower temperatures. VG-31 to VG-38 are understood to have a crystallization peak in a DTA curve. However, this is not a particular problem because there is a sufficiently large temperature difference between $T_{cry}$ and $T_s$.

The oxide glasses of VG-01 to VG-45 have respectively a density d in a range of 3.5 to 5.8 $g/cm^3$. There is a tendency that the higher the content of an element having a high specific gravity, the higher the density of the oxide glass. Specifically, in the case of the oxide glass (VG-28 to VG-45) made of $V_2O_3$, $TeO_2$ and $Ag_2O$ as major constituents, when the content of the major constituents shows the following relationship: "$V_2O_3 \leq TeO_2 \leq Ag_2O$," the density is 5 $g/cm^3$ or more, which is a relatively large value.

Experimental 2

In the present experimental, a joining material including the aforementioned oxide glass was prepared to produce a conductive joint article, and the electrical joinability (connection resistance) of the conductive joint article was studied.

(Preparation of Joining Paste Material)

Each of the oxide glass powders (VG-01 to VG-45) produced in Experimental 1 was mixed and kneaded with metal particles, a binder, and a solvent to produce joining paste materials of VG-01 to VG-45. As the metal particles, an Ag powder (manufactured by Fukuda Metal Foil & Powder Co., Ltd., AGC-103, average particle diameter of 1.4 μm) was used. The oxide glass powders and the metal particles were mixed at a ratio of 30% by volume oxide glass powder and 70% by volume metal particles.

With respect to the oxide glass powders (VG-01 to VG-06, VG-08, VG-09, VG-12 to VG-16, VG-19, VG-21, VG-22, VG-24, VG-26, VG-27, and VG-31) having a softening point $T_s$ of 360° C. or more, ethyl cellulose and butyl carbitol acetate were used as a binder and a solvent, respectively (referred to as Group A). With respect to the oxide glass powders (VG-07, VG-10, VG-11, VG-17, VG-18, VG-20, VG-23, VG-25, VG-30, VG-32, and VG-39) having a softening point $T_s$ of 280° C. or more but less than 360° C., nitrocellulose and butyl carbitol acetate were used as a binder and a solvent, respectively (referred to as Group B). With respect to the oxide glass powders (VG-28, VG-29, VG-33 to VG-38, VG-40 to VG-45) having a softening point $T_s$ of less than 280° C., α-terpineol and isobornyl cyclohexanol were used as a solvent (referred to as Group C).

(Production of Conductive Joint Article)

The joining paste materials prepared above were used and were subjected to joining treatment in the procedure described below to produce the conductive joint articles.

Figure 5:
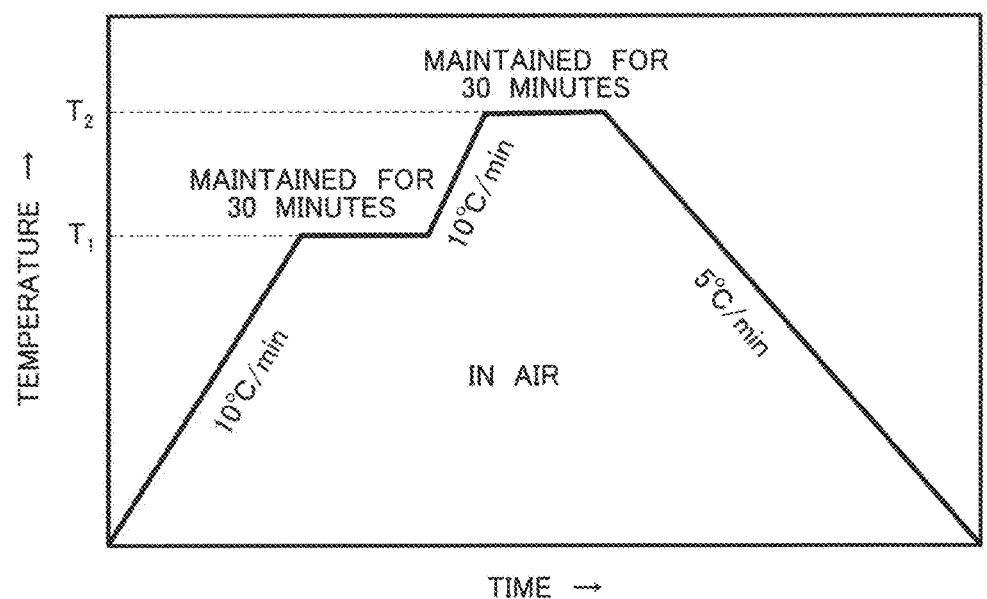
FIG. 5 shows an exemplary firing temperature profile for forming a baked coating film.

As the joined member 11, an Al plate (JIS A1100, 5 mm width×100 mm length×1 mm thickness) was provided. The joining paste material was applied to one end region (5 mm width×5 mm length) of the Al plate and was dried on a hot plate (about 150° C.) for 30 minutes (see FIG. 3(a)). Next, an electric furnace was used to perform firing according to a firing temperature profile illustrated in FIG. 5, and a baked coating film (5 mm width×5 mm length×about 25 μm thickness) was formed from the applied, joining paste material. FIG. 5 shows an exemplary firing temperature profile for forming a baked coating film. In FIG. 5, it is preferable that temperature $T_1$ is 10 to 30° C. lower than the softening point $T_s$ of the oxide glass forming the joining paste material and temperature $T_2$ is 30 to 50° C. higher than the softening point $T_s$.

As the joined member 12 joined to the joined member 11, an Al plate and a Cu plate (JIS C1020) having the same dimensions (5 mm width×100 mm length×1 mm thickness) as the joined member 11 were provided. Next, the joined members 11 and 12 were stacked via the baked coating film, and resistance welding was carried out with an applied-current-controlled resistance welding machine (see FIG. 3(b)).

The resistance welding conditions were as follows: the pressing stress was 8 MPa, the applied current density was 200 to 360 $A/mm^2$, and the current application duration was 30 ms. More specifically, a sample using the joining paste material of Group A had an applied current density of 360 $A/mm^2$, a sample using the joining paste material of Group B had an applied current density of 280 $A/mm^2$, and a sample using the joining paste material of Group C had an applied current density of 200 $A/mm^2$. According to a comparative experiment where resistance welding was carried out with an applied current density over 360 $A/mm^2$, it was confirmed that Al of the joined member started melting.

Figure 6:
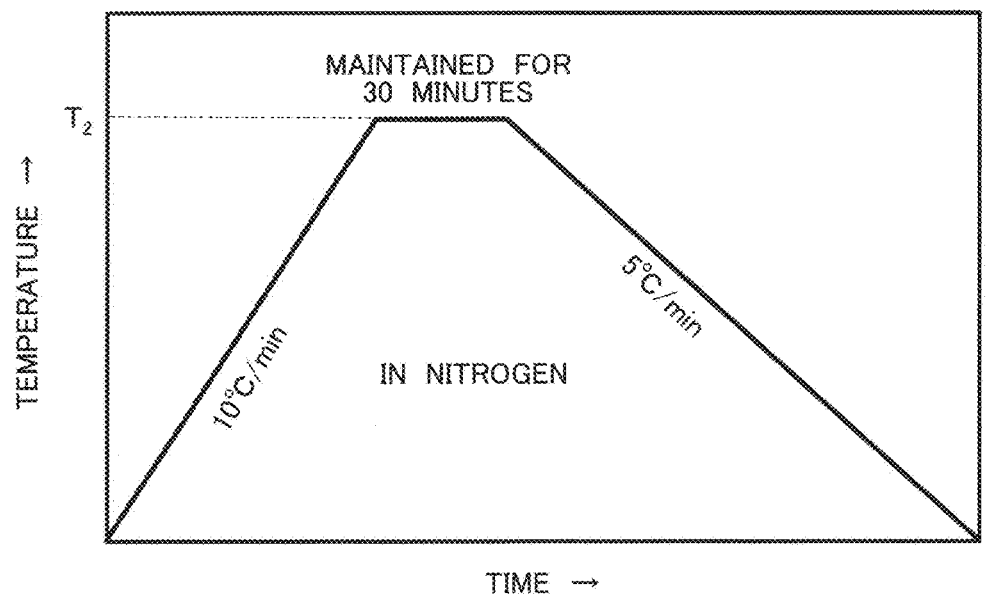
FIG. 6 shows an exemplary firing temperature profile of joining treatment by means of simple heating.

In addition, as another comparative experiment, an electric furnace was used to carry out joining treatment by means of simple heating according to a firing temperature profile illustrated in FIG. 6. As an experimental sample, a sample made of the joined members 11 and 12 stacked via a baked coating film where portions to be joined were fixed with a heat-resistant clip was used. FIG. 6 shows an exemplary firing temperature profile of joining treatment by means of simple heating. In FIG. 6, temperature $T_2$ is 30 to 50° C. higher than the softening point $T_s$ of the oxide glass forming the joining paste material. The reason why firing was carried out under a nitrogen atmosphere was to suppress oxidation of the Cu plate, which was used as the joined member 12.

As yet another comparative experiment, instead of the oxide glass (VG-01 to VG-45) of the invention, commercially available low-melting glass that is free of $V_2O_3$ was used to produce the joining paste material, and the same joining treatment (joining treatment by means of resistance welding and joining treatment by means of simple heating) as above was carried out. As the commercially available low-melting glass, PbO—$B_2O_3$-based low-melting glass ($T_s$=402° C.; referred to as PBG) and $Bi_2O_3$—$B_2O_3$-based low-melting glass ($T_s$=445° C.; referred to as BBG) were used.

(Evaluation of Electrical Conductivity of Conductive Joint Article)

The electrical conductivities of the joining portions of samples of the various conductive joint articles produced in the aforementioned manner were evaluated. As the electrical conductivities of the joining portions, the connection resistance between the joined members 11 and 12 was measured by four-probe resistive method.

First, as references of electrical conductivity evaluation, the connection resistance obtained when Cu plates were solder-joined at 250° C. with an Sn-3.5% Ag solder and the connection resistance obtained when Al plates were solder-joined at 250° C. similarly with an Sn-3.5% Ag solder were measured. As a result, the connection resistance obtained when the Cu plates were solder-joined was about $5 \times 10^{-6}$ $\Omega/mm^2$, and the connection resistance obtained when the Al plates were solder-joined was $10^{-3}$ to $10^{-2}$ $\Omega/mm^2$ order, showing a large variation.

In the wake of the results of the referential samples, the electrical conductivities of the various conductive joint articles produced were evaluated regarding the connection resistance between the joined members 11 and 12 as follows: $1\times10^{-3}$ $\Omega/mm^2$ or more was determined to be "Failed", less than $1\times10^{-3}$ $\Omega/mm^2$ and $1\times10^{-5}$ $\Omega/mm^2$ or more were determined to be "Conventional Level", less than $1\times10^{-5}$ $\Omega/mm^2$ was determined to be "Passed", and $5\times10^{-6}$ $\Omega/mm^2$ or less was determined to be "Excellent". The results of the evaluation of the electrical conductivities are described in Tables 5 and 6. In Tables 5 and 6, the case where the joined members 11 and 12 are both Al plates is described as "Al/Al Joint Article" and the case where the joined member 11 is an Al plate and the joined member 12 is a Cu plate is described as "Al/Cu Joint Article".

TABLE 5

Evaluation of Electrical Conductivities of Conductive Joint Articles (No. 1).

| Joining Paste Material | Joining by Resistance Welding | | Joining by Simple Heating | |
| --- | --- | --- | --- | --- |
| | Al/Al Joint Article | Al/Cu Joint Article | Al/Al Joint Article | Al/Cu Joint Article |
| VG-01 | Passed | Passed | Failed | Failed |
| VG-02 | Passed | Passed | Failed | Failed |
| VG-03 | Passed | Passed | Failed | Failed |
| VG-04 | Passed | Passed | Failed | Failed |
| VG-05 | Passed | Passed | Failed | Failed |
| VG-06 | Passed | Passed | Failed | Failed |
| VG-07 | Passed | Passed | Failed | Failed |
| VG-08 | Passed | Passed | Failed | Failed |
| VG-09 | Passed | Passed | Failed | Failed |
| VG-10 | Passed | Passed | Failed | Failed |
| VG-11 | Passed | Passed | Failed | Failed |
| VG-12 | Passed | Passed | Failed | Failed |
| VG-13 | Passed | Passed | Failed | Failed |
| VG-14 | Passed | Passed | Failed | Failed |
| VG-15 | Passed | Passed | Failed | Failed |
| VG-16 | Passed | Passed | Failed | Failed |
| VG-17 | Passed | Passed | Failed | Failed |
| VG-18 | Passed | Passed | Failed | Failed |
| VG-19 | Passed | Passed | Failed | Failed |
| VG-20 | Passed | Passed | Failed | Failed |
| VG-21 | Passed | Passed | Failed | Failed |
| VG-22 | Passed | Passed | Failed | Failed |
| VG-23 | Excellent | Excellent | Failed | Failed |
| VG-24 | Excellent | Excellent | Failed | Failed |
| VG-25 | Excellent | Excellent | Failed | Failed |
| VG-26 | Passed | Passed | Failed | Failed |
| VG-27 | Passed | Passed | Failed | Failed |

TABLE 6

Evaluation of Electrical Conductivities of Conductive Joint Articles (No. 2).

| Joining Paste Material | Joining by Resistance Welding | | Joining by Simple Heating | |
| --- | --- | --- | --- | --- |
| | Al/Al Joint Article | Al/Cu Joint Article | Al/Al Joint Article | Al/Cu Joint Article |
| VG-28 | Excellent | Excellent | Conventional Level | Conventional Level |
| VG-29 | Excellent | Excellent | Conventional Level | Conventional Level |
| VG-30 | Excellent | Excellent | Conventional Level | Conventional Level |
| VG-31 | Passed | Passed | Failed | Failed |
| VG-32 | Excellent | Excellent | Failed | Failed |
| VG-33 | Excellent | Excellent | Conventional Level | Conventional Level |
| VG-34 | Excellent | Excellent | Failed | Failed |
| VG-35 | Excellent | Excellent | Failed | Failed |
| VG-36 | Excellent | Excellent | Failed | Failed |
| VG-37 | Excellent | Excellent | Failed | Failed |
| VG-38 | Excellent | Excellent | Failed | Failed |
| VG-39 | Excellent | Excellent | Conventional Level | Conventional Level |
| VG-40 | Excellent | Excellent | Conventional Level | Conventional Level |
| VG-41 | Excellent | Excellent | Conventional Level | Conventional Level |
| VG-42 | Excellent | Excellent | Conventional Level | Conventional Level |
| VG-43 | Excellent | Excellent | Conventional Level | Conventional Level |
| VG-44 | Excellent | Excellent | Conventional Level | Conventional Level |
| VG-45 | Excellent | Excellent | Conventional Level | Conventional Level |
| PBG | Failed | Failed | Failed | Failed |
| BBC | Failed | Failed | Failed | Failed |

As shown in Tables 5 and 6, when the joining treatment by means of simple heating is carried out, none of the joint articles using the joining paste materials (VG-01 to VG-45, PBG, and BBG) achieves the connection resistance of the passed level (less than $1\times10^{-5}$ $\Omega/mm^2$). Meanwhile, in the case of the joining treatment by means of simple heating, the connection resistance of the Al/Al joint article was about twice the connection resistance of the Al/Cu joint article. This means that the contact resistance of the Cu/joining layer is negligibly low as compared with the contact resistance of the Al/joining layer, strongly suggesting that the connection resistance of the joint article is practically mostly determined by the contact resistance of the Al/joining layer.

In contrast to the results of simple heating, in the case of the joining treatment by means of resistance welding, the joint article using the joining paste material (VG-01 to VG-45) of the invention achieves connection resistance of the passed level (less than $1\times10^{-5}$ $\Omega/mm^2$) or the excellent level. In particular, the joint article using the joining paste material containing a large proportion (e.g., containing 30% by weight or more) of $Ag_2O$ as a major constituent of the oxide glass achieves the connection resistance of the excellent level ($5\times10^{-6}$ $\Omega/mm^2$ or less). On the other hand, the joint article of the joining paste material (PBG, BBG) using commercially available low-melting glass that is free of $V_2O_5$ cannot achieve the connection resistance of the passed level even with the joining treatment by means of resistance welding.

According to the above results, the joining paste material of the invention containing $V_2O_5$ as a major constituent of the oxide glass is understood to greatly contribute to reduction and removal of the oxide film formed on the surface of the joined members 11 and 12 by current application of resistance welding and effectively contribute to the formation of the conductive bonding phase 52 along the current direction.

In addition, since the method for manufacturing the conductive joint article according to the invention is joining treatment by means of resistance welding, the method enables joining in a very short period of time as compared with the joining treatment by means of simple heating. Specifically, the method has an advantage of being superior from the viewpoint of workability and mass productivity (and thus from the viewpoint of manufacturing cost).

Experimental 3

In the present experimental, the mixing ratio of the oxide glass and the metal particle in the joining paste material was studied.

(Preparation of Joining Paste Material)

The oxide glass powder VG-41 produced in Experimental 1 was mixed and kneaded with the Ag powder and a solvent (α-terpineol, isobornyl cyclohexanol) used in Experimental 2 to produce a joining paste material. There are following ten types of mixing ratio by volume of VG-41 and the Ag powder: "0:100", "5:95", "10:90", "20:80", "30:70", "40:60", "50:50", "70:30", "90:10", and "100:0".

(Production of Conductive Joint Article)

As the joined members 11 and 12, a pair of Al alloy plates having the same dimensions (5 mm width×100 mm length×1 mm thickness) as in the case of Experimental 2 was provided. Similarly, a pair of Mg alloy plates was provided. As the Al alloy, an Al—Cu—Mg-based alloy (JIS A2024) was used, and as the Mg alloy, an Mg—Al—Zn-based alloy (JIS AZ91) was used.

As in the case of Experimental 2, the joining paste material VG-41 was applied to one end region (5 mm width×5 mm length) of the Al alloy plates and the Mg alloy plates, and was dried on a hot plate (about 150° C.) for 30 minutes (see FIG. 3(a)). Then, the Al alloy plates and the Mg alloy plates in pairs were stacked via the dried, joining paste material, and resistance welding was carried out with an applied-current-controlled resistance welding machine (see FIG. 3(b)). The resistance welding conditions were as follows: the pressing stress was 8 to 12 MPa, the applied current density was 80 to 360 A/mm$^2$, and the current application duration was 10 to 100 ms.

(Evaluation of Electrical Conductivities of Conductive Joint Articles)

As in the case of Experimental 2, the Al alloy/Al alloy joint article and the Mg alloy/Mg alloy joint article produced in the aforementioned manner were evaluated as to the electrical conductivity of the joining portions. The specification of the conductive joint articles and the results of the evaluation of the electrical conductivities are described in Table 7.

TABLE 7

Specifications of Conductive Joint Articles and Evaluation of Electrical Conductivities thereof.

| | Specification of Conductive Joint Article | | | | | | |
|---|---|---|---|---|---|---|---|
| | Mixing Ratio of Glass/Ag Powder | | Joining Conditions of Resistance Welding | | | Electrical Conductivity Evaluation | |
| Joining Experiment No. | VG-41 (volume %) | Ag Powder (volume %) | Pressing Stress (MPa) | Current Density (A/mm$^2$) | Current Application Duration (ms) | Al-Alloy/ Al-Alloy Joint Article | Mg-Alloy/ Mg-Alloy Joint Article |
| 3-1 | 0 | 100 | 8 | 360 | 10 | Failed | Failed |
| 3-2 | 5 | 95 | 8 | 360 | 10 | Passed | Passed |
| 3-3 | 10 | 90 | 8 | 280 | 10 | Excellent | Excellent |
| 3-4 | 20 | 80 | 8 | 280 | 30 | Excellent | Excellent |
| 3-5 | 30 | 70 | 8 | 200 | 10 | Excellent | Excellent |
| 3-6 | 40 | 60 | 8 | 200 | 30 | Excellent | Excellent |
| 3-7 | 50 | 50 | 10 | 200 | 50 | Excellent | Excellent |
| 3-8 | 70 | 30 | 10 | 120 | 70 | Passed | Passed |
| 3-9 | 90 | 10 | 12 | 80 | 100 | Passed | Passed |
| 3-10 | 100 | 0 | 12 | 80 | 100 | Passed | Passed |

As shown in Table 7, in Joining Experiment 3-1, both the Al alloy/Al alloy joint article and the Mg alloy/Mg alloy joint article have high connection resistance at the joining portions and cannot obtain favorable electrical conductive joining. This is because, in Joining Experiment 3-1, the joining paste material does not include the $V_2O_5$-containing oxide glass of the invention, and the oxide film on the surface of the joined members formed of an Al alloy or an Mg alloy cannot be removed effectively. It is also confirmed that the joint article of Joining Experiment 3-1 is easily separated and has insufficient mechanical joinability.

In Joining Experiments 3-2 to 3-10, both the Al alloy/Al alloy joint article and the Mg alloy/Mg alloy joint article have low connection resistance at the joining portions and have favorable electrical conductive joining of the passed level or more (i.e., less than $1 \times 10^{-5}$ $\Omega/mm^2$). In particular, in Joining Experiments 3-3 to 3-7, the connection resistance of the excellent level ($5 \times 10^{-6}$ $\Omega/mm^2$ or less) is achieved.

In addition, very interestingly, in Joining Experiment 3-10, although the joining paste material does not contain the Ag powder (Ag particles), favorable electrical conductive joining of the passed level is obtained. As a result of observation of the microstructure of the joining portion, it is confirmed that the conductive metal phase 42 and the conductive bonding phase 52, which are presumably formed of the Ag constituent, are formed in the oxide glass phase 32, which is the matrix. Specifically, when the oxide glass forming the joining material contains $Ag_2O$ as a major constituent, part of the Ag constituent is understood to be deposited along the current direction by the current application of the resistance welding and form the conductive metal phase 42 and the conductive bonding phase 52.

Experimental 4

In the present experimental, types of the metal powder (metal particles) of the joining material and types of the joined member were studied.

(Preparation of Joining Preform Material)

The oxide glass powder VG-41 produced in Experimental 1 was mixed and kneaded with a metal powder, a binder (modified polyphenylene ether), and a solvent (butyl carbitol acetate) into the form of clay, which was then shaped into a sheet and the solvent was evaporated on a hot plate (about 150° C.) so that a joining preform material (5 mm width×5 mm length×0.3 mm thickness) was produced. As the metal powder, the following 11 types were used: an Au powder, an Ag powder, a Cu powder, an Al powder, an Ni powder, an Sn powder, a Zn powder, an Au—Sn alloy powder, an Sn—Ag alloy powder, a Cu—Al alloy powder (content: Cu>>Al), and an Al—Cu alloy powder (content: Al>>Cu), all of which had an average particle diameter of 10 μm or less. The mixing ratio by volume of VG-41 and the metal powder was "30:70".

(Production of Conductive Joint Article)

As the joined members 11 and 12, the following six types were provided: an Al plate, a Cu plate, an Ni plate, an Al alloy plate (JIS A2024), an Mg alloy plate (JIS AZ91), and a silicon-carbide-particle-dispersed aluminum plate (Al—SiC), all of which had the same dimensions (5 mm width× 100 mm length×1 mm thickness) as Experimental 2.

As in the case of Experimental 2, the joining preform material VG-41 was arranged on one end region (5 mm width×5 mm length) of the joined member 11 (see FIG. 3(a)). Then, the joined member 12 was stacked via the joining preform material, and resistance welding was carried out with an applied-current-controlled resistance welding machine (see FIG. 3(b)). The resistance welding conditions were as follows: the pressing stress was 12 MPa, the applied current density was 200 $A/mm^2$, and the current application duration was 50 ms. There were following six types of the combination of the joined members 11 and 12: an Al/Al joint article, an Al/Cu joint article, a Cu/Cu joint article, a Cu/Ni joint article, an Al alloy/Mg alloy joint article, and a Cu/Al—SiC joint article.

(Evaluation of Electrical Conductivities of Conductive Joint Articles)

The various joint articles produced in the aforementioned manner were evaluated as to the electrical conductivities of the joining portions in the same manner as Experimental 2. Results of the evaluation of the electrical conductivities of the combinations of the metal powders and the joint articles are described in Table 8.

TABLE 8

Evaluation of Electrical Conductivities of Combinations of Metal Powders and Joint Articles.

| Joining Experiment No. | Metal Powder | Conductive Joint Article | | | | | |
|---|---|---|---|---|---|---|---|
| | | Al/Al Joint Article | Al/Cu Joint Article | Cu/Cu Joint Article | Cu/Ni Joint Article | Al-Alloy/ Mg-Alloy Joint Article | Cu/Al-SiC Joint Article |
| 4-1 | Au | Excellent | Excellent | Excellent | Excellent | Excellent | Excellent |
| 4-2 | Ag | Excellent | Excellent | Excellent | Excellent | Excellent | Excellent |
| 4-3 | Cu | Passed | Passed | Passed | Passed | Passed | Passed |
| 4-4 | Al | Excellent | Excellent | Excellent | Excellent | Excellent | Excellent |
| 4-5 | Ni | Passed | Passed | Passed | Passed | Passed | Passed |
| 4-6 | Sn | Excellent | Excellent | Excellent | Excellent | Excellent | Excellent |
| 4-7 | Zn | Passed | Passed | Passed | Passed | Passed | Passed |
| 4-8 | Au—Sn alloy | Excellent | Excellent | Excellent | Excellent | Excellent | Excellent |
| 4-9 | Sn—Ag alloy | Excellent | Excellent | Excellent | Excellent | Excellent | Excellent |
| 4-10 | Cu—Al alloy | Passed | Passed | Passed | Passed | Passed | Passed |
| 4-11 | Al—Cu alloy | Excellent | Excellent | Excellent | Excellent | Excellent | Excellent |

As shown in Table 8, all the combinations of the experiments have low connection resistance of the joining portions and provide favorable electrical conductive joining of the passed level or more (less than $1 \times 10^{-5}$ $\Omega/mm^2$). In particular, in Joining Experiments 4-1, 4-2, 4-4, 4-6, 4-8, 4-9, and 4-11, the connection resistance of the excellent level ($5 \times 10^{-6}$ $\Omega/mm^2$ or less) is achieved.

As described heretofore, it is confirmed that the present invention can provide a conductive joint article exhibiting electrical joinability comparable to that of solder joining of easy-to-solder joinable metals even when a joined member is made of a hard-to-solder joinable metal, and a method for manufacturing the conductive joint article.

The above embodiments and examples are given for the purpose of detailed explanation only, and the invention is not intended to include all features and aspects of the embodiments and examples described above. Then, the invention is not limited to the above described embodiments and examples, and various modifications can be made. For example, a part of an embodiment may be replaced by a well-known technique, or added with a well-known technique. That is, various combinations with a well-known technique and modifications based on a well-known technique are possible without departing from the technical idea of the invention where appropriate.

LEGEND 100, 200 . . . conductive joint article;
11, 12 . . . joined member;
21, 22 . . . joining layer;
23 . . . joining material;
31 . . . low-melting glass phase;
32 . . . oxide glass phase;
41 . . . electrical conductive particle;
42 . . . conductive metal phase;
51, 52 . . . conductive bonding phase; and
61, 62 . . . resistance welding electrode.

The invention claimed is:

1. A conductive joint article with conductive joined members electrically joined via a joining layer, at least one of the joined members being made of a hard-to-solder joinable metal, wherein
the joining layer comprises an oxide glass phase and a conductive metal phase, the oxide glass phase containing vanadium as a major constituent and at least one of phosphorus, barium and tungsten as an accessory constituent, the oxide glass phase having a glass transition point of 390° C. or less,
the joining layer comprises a large number of conductive paths resulting from resistance welding, and a connection resistance between the joined members is less than $1 \times 10^{-5}$ $\Omega/mm^2$.

2. The conductive joint article according to claim 1, wherein
the hard-to-solder joinable metal is a light metal or a composite material including the light metal.

3. The conductive joint article according to claim 2, wherein
the light metal is aluminum, an aluminum alloy, and/or a magnesium alloy.

4. The conductive joint article according to claim 1, wherein
the oxide glass phase further contains tellurium and/or silver as a major constituent, and has a glass transition point of 355° C. or less.

5. The conductive joint article according to claim 4, wherein
the oxide glass phase further contains at least one of yttrium, lanthanum, iron and aluminum as an accessory constituent, and has a glass transition point of 200° C. or less.

6. The conductive joint article according to claim 1, wherein
the conductive metal phase is made of at least one of gold, silver, copper, aluminum, nickel, tin, zinc and an alloy including one of them as a main constituent.

7. The conductive joint article according to claim 1, wherein
the joining layer comprises 10% by volume or more and 95% by volume or less of the conductive metal phase and a balance of the oxide glass phase.

8. A method for manufacturing the conductive joint article of claim 1,
comprising:
a joining material preparation step of preparing the joining material; and
a joined member joining treatment step of interposing the joining material between the joined members and carrying out resistance welding.

9. The method according to claim 8, wherein
resistance welding conditions of the joined member joining treatment step are such that a pressing stress on the joined member is 8 MPa or more and 15 MPa or less.

10. The method according to claim 8, wherein
the hard-to-solder joinable metal is a light metal or a composite material including the light metal.

11. The method according to claim 10, wherein
the light metal is aluminum, an aluminum alloy, and/or a magnesium alloy.

12. The method according to claim 8, wherein
the oxide glass phase of the joining material further contains a silver oxide as a major constituent, has a glass transition point of 355° C. or less, but is not provided with metal particles.

13. The method according to claim 12, wherein
the oxide glass phase of the joining material further contains at least one of a yttrium oxide, a lanthanum oxide, an iron oxide and an aluminum oxide as an accessory constituent, and has a glass transition point of 200° C. or less.

14. The method according to claim 8, wherein
the oxide glass phase of the joining material further contains a tellurium oxide as a major constituent, has a glass transition point of 355° C. or less, and is mixed with metal particles.

15. The method according to claim 14, wherein
the metal particles are made of at least one of gold, silver, copper, aluminum, nickel, tin, zinc and an alloy including one of them as a main constituent, and
when a total volumetric percentage of the oxide glass phase and the metal particles in the joining material is 100% by volume, the percentage of the metal particles is 10% by volume or more and 95% by volume or less.

* * * * *